Figure 1:
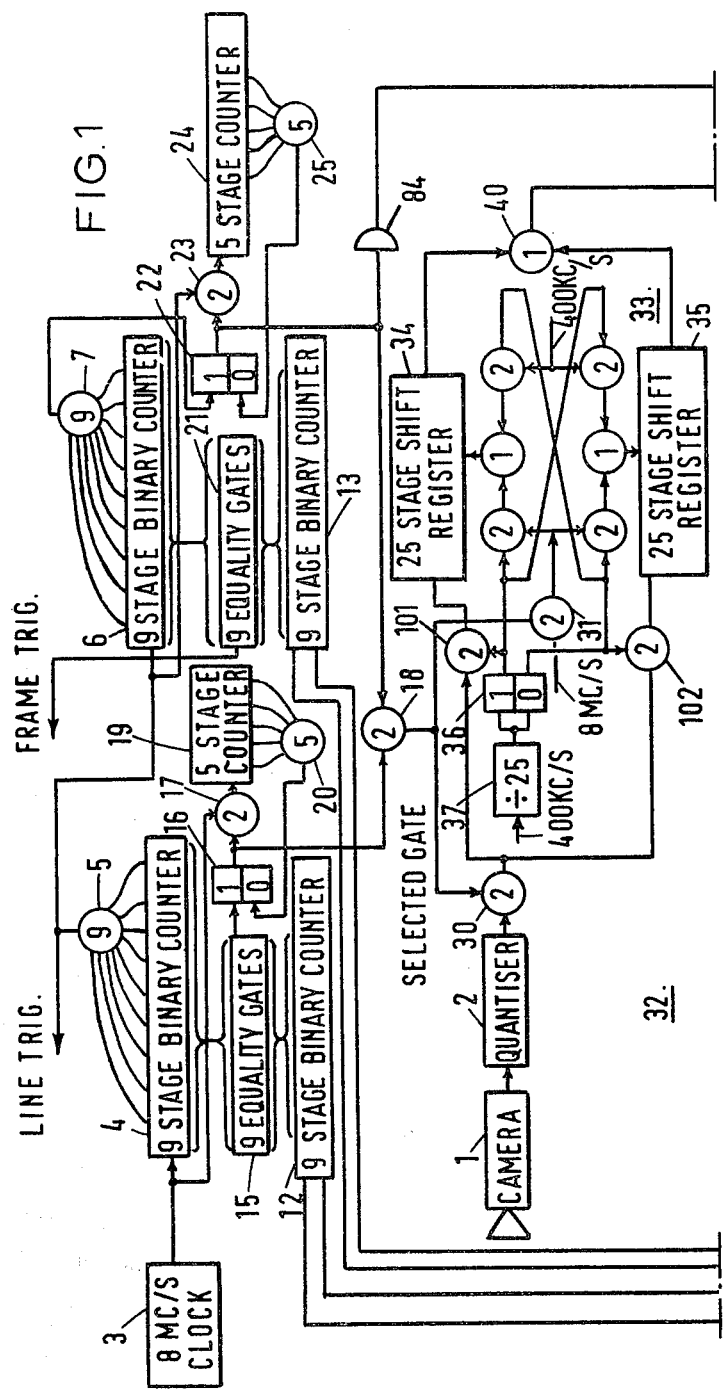
Figure 1:
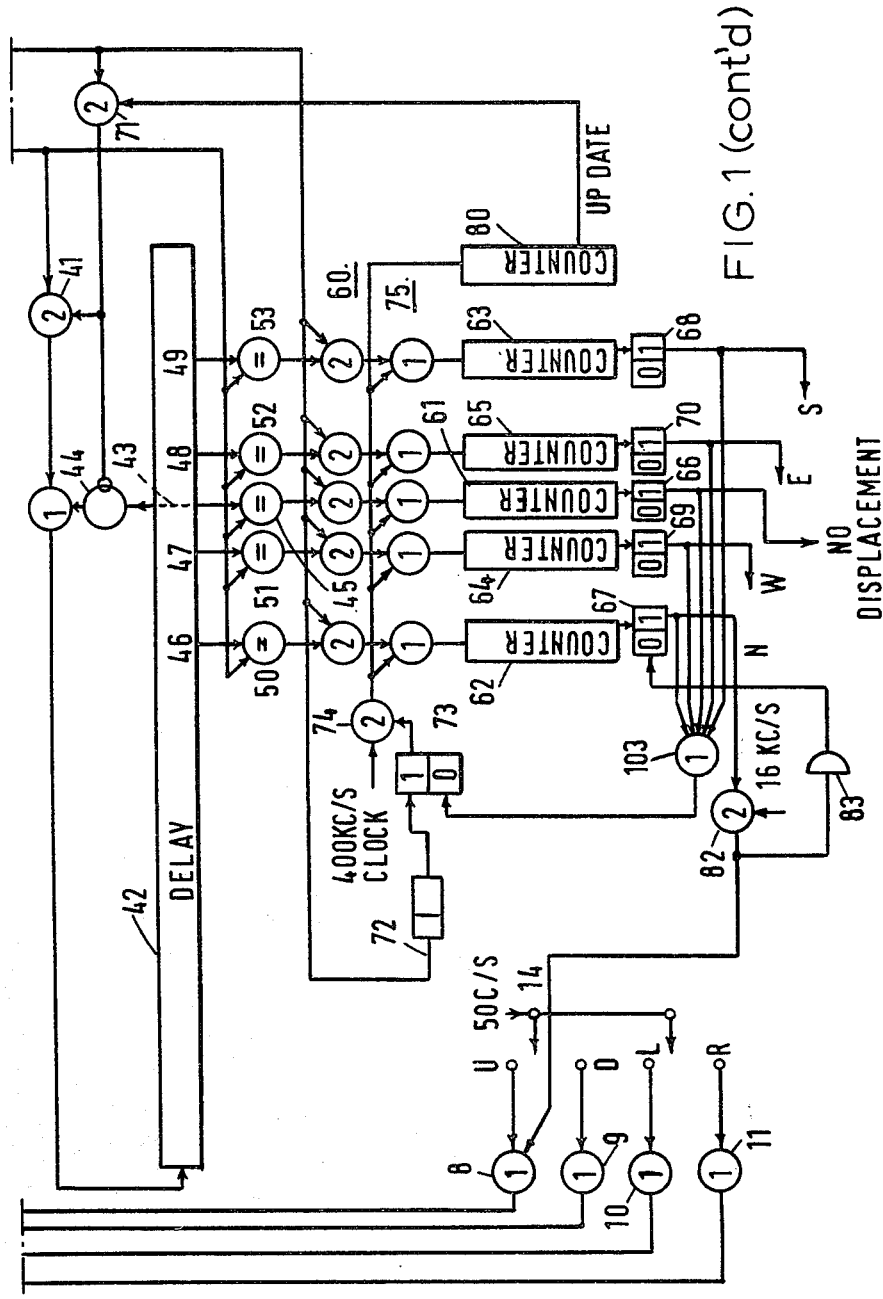

United States Patent [19]

Ingham et al.

[11] 3,955,046
[45] May 4, 1976

[54] IMPROVEMENTS RELATING TO AUTOMATIC TARGET FOLLOWING APPARATUS

[75] Inventors: William Ellis Ingham, Ealing; Gordon William Newbery, Stoke Poges, both of England

[73] Assignee: E M I Limited, Hayes, England

[22] Filed: Apr. 26, 1967

[21] Appl. No.: 637,032

[30] Foreign Application Priority Data
Apr. 27, 1966 United Kingdom............... 18548/66

[52] U.S. Cl. .......................... 178/6.8; 178/DIG. 21; 250/203 CT; 244/3.17
[51] Int. Cl.[2] .......................................... H04N 3/00
[58] Field of Search ................................ 178/6–8, 178/DIG. 21; 250/203; 244/3.17

[56] References Cited
UNITED STATES PATENTS

| | | | |
|---|---|---|---|
| 2,764,698 | 9/1956 | Knight............................ | 178/6.8 UX |
| 2,774,964 | 12/1956 | Baker et al. ...................... | 178/6.8 X |
| 3,010,024 | 11/1961 | Barnett et al. .................... | 250/203 |
| 3,039,002 | 6/1962 | Guerth............................ | 250/203 |
| 3,257,505 | 6/1966 | Van Wechel ...................... | 178/6.8 |
| 3,290,506 | 12/1966 | Bertram .......................... | 250/203 |
| 3,341,653 | 9/1967 | Kruse............................. | 178/6.8 |
| 3,416,752 | 12/1968 | Hembree ......................... | 244/3.17 |

Primary Examiner—Maynard R. Wilbur
Assistant Examiner—S. C. Buczinski
Attorney, Agent, or Firm—Fleit & Jacobson

EXEMPLARY CLAIM

3. Automatic target following apparatus comprising
  a. sensing means for deriving a video signal representing a target,
  b. means for storing signal elements from a frame of said video signal,
  c. means for comparing signal elements from a subsequent frame of said video signal with the stored signal elements with different relative phase shifts to detect deviation from a desired point of view of the target,
  d. said comparing means including means for deriving a plurality of correlation signals dependent on the correlations of the signal elements from said subsequent frame and said stored signal elements with different relative phase shifts,
  e. means for deriving a guidance signal for the apparatus responsive to the largest of said correlation signals,
  f. means for detecting a decline in the correlation of signal elements from said subsequent frame with said stored signal elements, and
  g. means for updating said stored signal elements when the decline exceeds a pre-arranged limit, thereby to allow for changes in the relative size of the target with approach of the apparatus thereto.

7 Claims, 6 Drawing Figures

IMPROVEMENTS RELATING TO AUTOMATIC TARGET FOLLOWING APPARATUS

This invention relates to automatic target following apparatus.

One form of automatic target following apparatus which has been proposed includes a television camera which generates a video signal representing the scene viewed by the camera. Such a camera may for example be provided in a missile which is aimed at a target and the video signal from successive frames scanned by the camera is processed to detect any deviation of the missile from the desired course.

The object of the present invention is to provide improved automatic target following apparatus especially with a view to allowing for changes of the relative size in the target with approach of the apparatus thereto.

A further object of the present invention is to provide improved automatic target following apparatus comprising sensing means for deriving a video signal representing a target, means for storing signal elements from a frame of said video signal, means for comparing signal elements from a subsequent frame of the video signal with the stored signal elements with different relative phase shifts to detect deviation from a desired point of view of the target, means for deriving a guidance signal for the apparatus from said comparing means, means for detecting a decline in the correlation of signal elements from said subsequent frame with said stored signal elements, and means for up-dating said stored signal elements when the decline exceeds a pre-arranged limit, thereby to allow for changes in the relative size of the target with approach of the apparatus thereto.

The expression "video signal" is used to mean a signal which sequentially represents elements in a field of view taken in a prearranged order which repeats itself, each sequence of signal elements being termed a frame.

Figure 2:
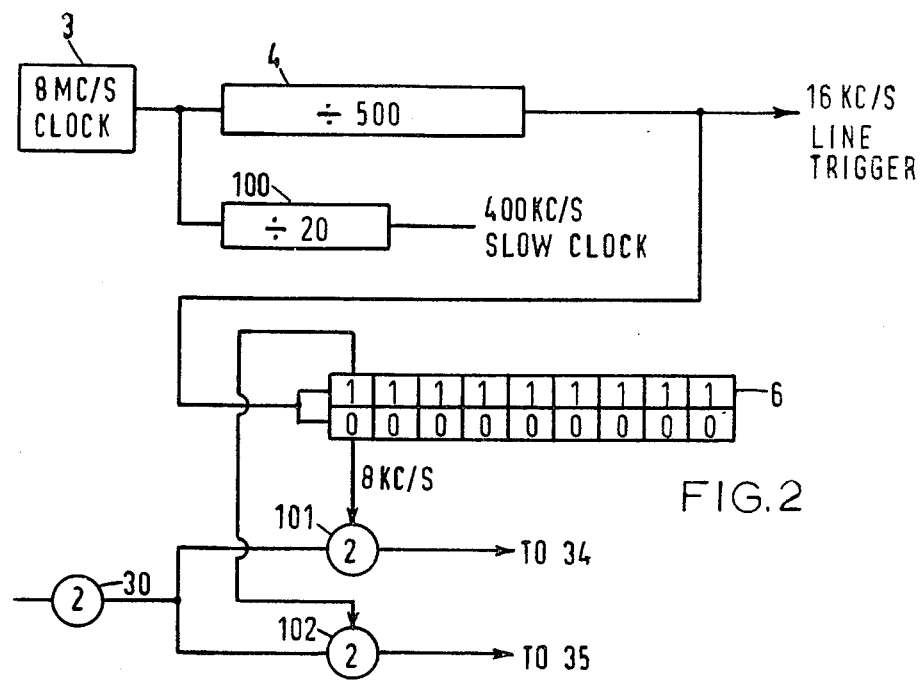
Figure 3:
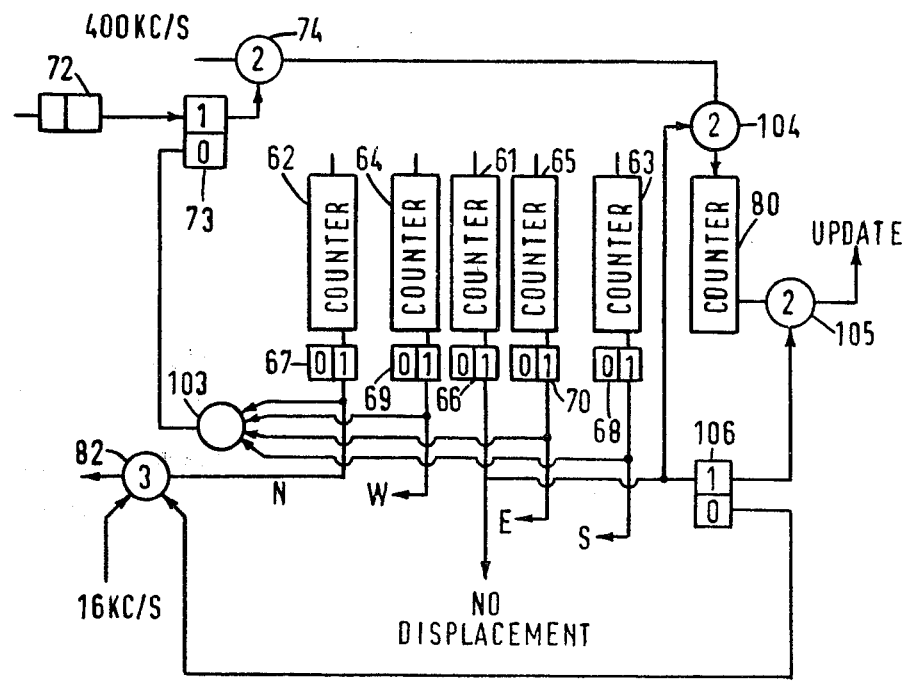
Figure 4:
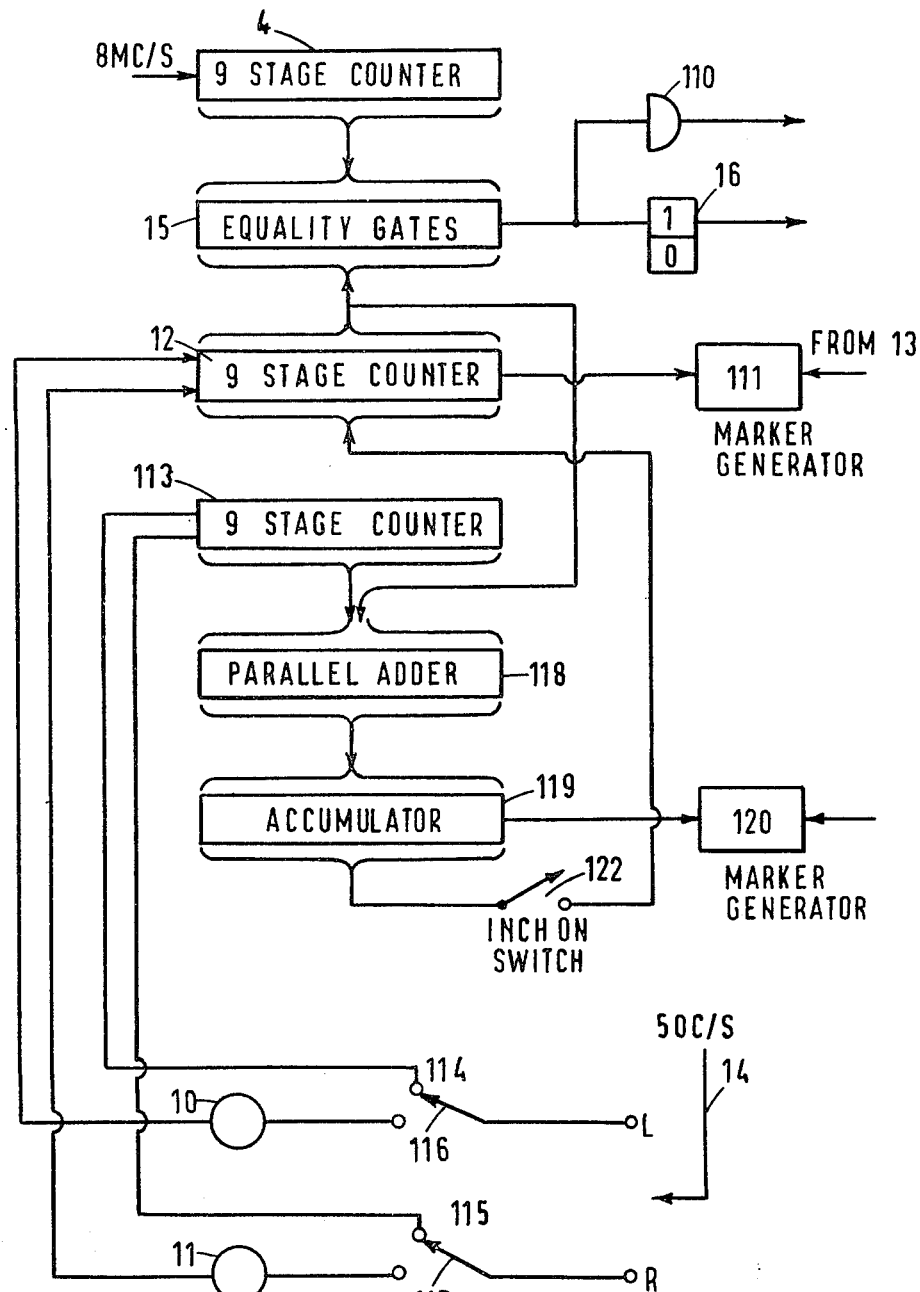
Figure 5:
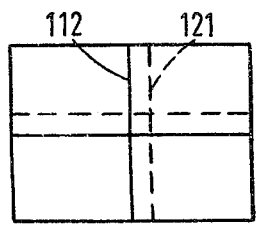
Figure 6:
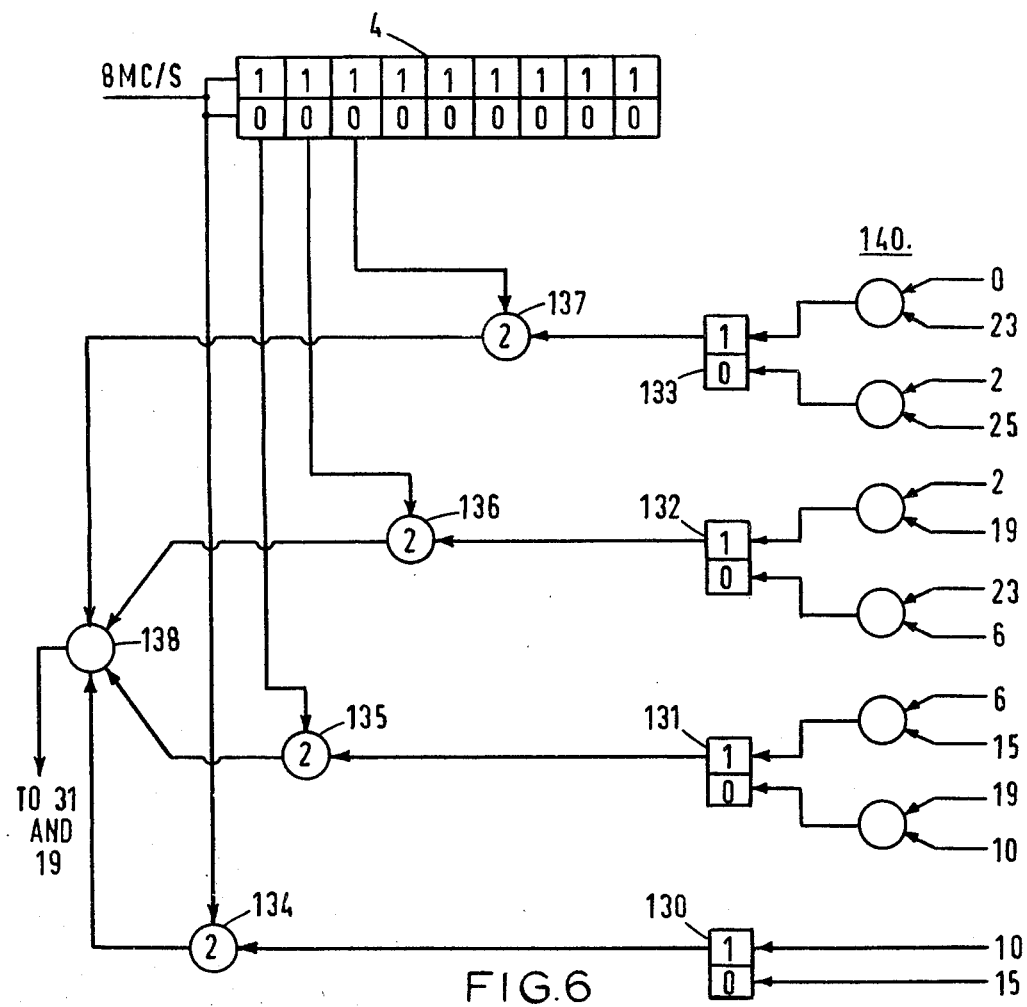

In order that the present invention may be clearly understood and readily carried into effect it will now be described with reference to the accompanying drawings in which:

FIG. 1 is a block diagram illustrating one example of automatic target following apparatus according to the invention, FIG. 2 illustrates a modification of the arrangement illustrated in FIG. 1 relating to the generating of clock pulses, FIG. 3 illustrates another modification which may be made to the arrangement illustrated in FIG. 1 so as to make the updating criterion depend on the steepness of the correlation curve, FIG. 4 illustrates another modification of the arrangement illustrated in FIG. 1 to provide a facility for inching and stabilisation of the display, FIG. 5 is a diagram explanatory of the operation of FIG. 4, FIG. 6 illustrates another modification of the arrangement illustrated in FIG. 1 whereby the signal elements stored in the registers 34 and 35 represent a variable definition of stored information.

Referring to the drawing, the apparatus comprises a television camera represented by the block 1, the camera being of normal construction and having a scanning standard of 50 frames per second each of 325 lines, without interlacing. It produces a video signal to a quantiser 2 which converts the video output of the camera into a binary waveform consisting of a signal element representing 1 or 0 for each picture point scanned by the camera. The threshold between the two signal levels representing 1 and 0 is determined by the mean level of brightness of the whole scene. If desired the quantiser may be arranged to discriminate between more than two signal levels, say eight. A clock pulse generator 3 generates clock pulses of 8 Mc/s and these are applied to a nine-stage binary counter 4, outputs from selected stages of which are taken to a coincidence gate 5 so arranged that a pulse is produced from the gate every 62.5$\mu$s, these pulses being employed as line trigger pulses in the camera and other parts of the apparatus. The pulses are moreover applied to a further nine-stage binary counter 6, from selected stages of which outputs are taken to a coincidence gate 7 to initiate frame gating pulses approximately every 20 ms. The counters 4 and 6 are reset each time the respective gates 5 and 7 produce a pulse.

The apparatus incorporates co-ordinate selection means consisting of four buffer stages 8 to 11 which are capable of feeding 50 c/s pulses to two further nine-stage binary counters 12 and 13. The selective supply of pulses to these binary counters can be effected by movement of a joy-stick 14. Variation of the position of the joy-stick makes the counters 12 and 13 count backward or forward until a required point on the scene viewed by the camera 1 is denoted by the counters. The joy-stick has two contacts the upper of which may be moved selectively into contact with the input terminals U and D of the buffers 8 and 9 and the lower of which may be moved selectively into contact with the input terminals L and R at the gates 10 and 11, to feed to the respective counters 12 and 13 a number of pulses determined by the movements of the joy-stick. The references U, D, L and R respectively denote up, down, left and right. The achievement of the desired point on the scene can be observed by means of movement of cross wires on a monitor, or otherwise in known manner. The corresponding stages of the counters 4 and 12, and 6 and 13 are connected to a set of nine equality gates denoted by the block 15 and 21. Each time the counter 4 registers a count equal to that registered in the counter 12, the equality gates 15 produce an output pulse which switches a bistable 16 to the 1 state. The bistable 16 opens gates 17 and 18, the former of which passes clock pulses from 3 to a five-stage counter 19. Connections are taken from this counter to a coincidence gate 20 which produces an output when pulse counter 19 registers a count of 25. The output from the gate 20 resets the bistable to the 0 state, removing the enabling pulses from the gates 17 and 18. The components 15, 16, 17, 19 and 20 operate to produce a gate pulse covering 25 picture elements of every line scanned by the camera 1, this gate pulse being applied to the gate 18. A similar group of equality gates 21 coupled to counters 6 and 13 produce an output pulse whenever the count in the counter 6 is equal to that in the counter 13, but these pulses are used not to initiate frame gating pulses but as the frame trigger pulses. As previously indicated, the pulses from the counter 6 are used to initiate frame gating pulses; they are applied to a bistable 22 (corresponding to the bistable 16) which is reset by means of a counter 24 and a gate 25, similar to the counter 19 and gate 20. The bistable therefore produces once in each frame a pulse lasting for twenty five lines. This pulse, called the frame gating pulse is applied to the gate 18 and also to a delay element 84.

The output of the gate 18 therefore consists of 25 line frequency pulses in every frame each of these 25 pulses covering 25 signal elements from the quantiser 2. The time of occurrence of these pulses relative to the line and frame trigger pulses is determined by the co-ordinates registered in the counters 12 and 13 and they define a selected portion of the camera frame i.e. a so called "gate."

The gate pulses from 18 are applied to gates 30, and 31 and when the gate 30 is open video signal elements from the quantiser 2 are fed into a standards converter 32. The standards converter consists of two twenty five stage shift registers 34 and 35 and a commutator 33 formed by a group of gates controlled by a bistable 36 which is switched alternately to its two states by the output of a frequency divider 37, which divides by twenty five, supplied with "slow" clock pulses, the frequency of which is 400 Kc/s. Each pulse from the frequency divider 37 has a duration of one camera line period. The commutator 33 feeds the signal elements from the gate 30 alternately into the registers 34 and 35 at the fast clock rate and feeds them out of these registers at the slow clock rate, the feed into one register occurring while feed out is taking place from the other, one line at a time. The slow rate signal elements from the standards converter 33 are fed by way of the buffer 40 to the gate 41 and when this gate is open, they pass to a magnetostrictive delay line 42 made of nickel wire. This line has an effective delay of twenty five line periods up to the tapping point 43 and it has an extension beyond this tapping point with a further delay of at least a line period. The tapping 43 is connected to a gate 44 which is inhibited whenever the gate 41 is open and vice versa. When the inhibition is removed from the gate 44 information in the delay line 42 is continuously recirculated, and when the apparatus is operational, circulation in this way is only interrupted when the information in the delay line 42 is being up-dated. The tap 43 is also connected to an equality gate 45 and further taps 46 to 49 on the delay line are connected as shown to further equality gates 50 to 53. The taps 47 and 48 are positioned to correspond to one picture point before and after the tap 43. The taps 46 and 49 are positioned to correspond to one line before and after the tap 43. There may be additional taps on the delay line 42. In addition to the signal elements from the respective taps the equality gates 45 and 50 to 53 all receive the same signal elements from the standards converter 32, and each compares the two sequences of applied signal elements. During the comparison process a twenty five line pulse from the bistable 22, delayed by one line period to compensate for the delay in 32, is applied to a series of gates 60 to open these gates and pass pulses from the respective equality circuits 45 and 50 to 53 to a series of counters 61 to 65. These counters register the correlation factors between the part of the scene enclosed by the gate, and the target image as represented by the signal elements in the delay line. The counter 61 registers a maximum correlation when the target image is centrally superimposed on the gate, and the other counters register maximum correlation when the target image is shifted by the distance of one element or one line (as the case may be) upward, downward, to left and to right. Therefore, the counters measure the degree of correspondence between the part of the scene enclosed by the gate and the stored information in the delay line. If there has been no displacement of the image, only counter 61 registers the maximum possible number. The other counters register maximum values when the target image is shifted. Each of the counters 61 to 65 has an output lead to which a pulse is applied when the counter is full, and this pulse is applied to the respective one of a group of bistables 66 to 70. Each twenty five line pulse which opens the gates 60 is also applied to a gate 71 and to an end element 72 connected to a bistable 73. The bistable 73 is therefore switched to the 1 state at the end of each correlation process and this opens a gate 74 to admit slow clock pulses via buffers 75 to the counters 61 to 65. Depending on the correlation factors registered in the counters, one counter will become full and will produce and output pulse before any other and switch the corresponding one of the bistables 66 to 71 to the 1 state. These bistables are connected via a buffer 103 to the bistable 73 and the first to be switched restores the latter bistable to the 0 state and terminates the supply of clock pulses to the counters 61 to 65. These counters are then cleared.

The slow clock pulses from the gate 74 are also supply to a further counter 80 so that it records the number of pulses from 74 needed to fill that one of the counters 61 to 65 which registers the best fit. The count recorded in the counter 80 after each correlation is therefore an indication of degree of misfit of the video signals within the gate from the target image stored in the delay line 42. As the part of the scene enclosed by the gate expands due to the approach to the target the successive counts registered in the counter 80 will increase and when the count exceeds some prearranged value an output signal is fed from the counter 80 to the gate 71. This output signal is sufficiently long to embrace the next gate, as determined by the pulse from the bistable 22 via the delay element 84. This opens the gate 71 to the next twenty five line pulse from the bistable 22 which opens the gate 41 and closes the gate 44. The circulation of the signal elements in the delay line 42 is thus stopped and the elements therein are replaced by signal elements derived from the standards converter 33. In this way the stored representation of the target is up-dated in response to the video signals from the camera, to allow for a change of the relative scale of the target. When the up-dating is completed the counter 80 is cleared. Up-dating the signal elements in the delay line 42 in response to the count recorded in the counter 80 prevents the accumulation of errors in the system such as would arise if up-dating occurred after every frame.

When a shift of the target relative to the camera frame is detected by any one of the equality gates 50 to 53 and the respective one of the bistable circuits 66 to 70, is switched to the one state, a predetermined number of clock pulses (which may be only one) is fed through one of the buffers 8 to 11 to the counter 12 or 13 producing an appropriate change in the co-ordinates registered by these counters. The means for achieving this effect are shown for the bistable 67 consisting of a connection to a gate 82 which when open feeds 16 Kc/s pulses to the buffer 8. The first pulse through the gate 82 is also fed by a delay element 83 to the bistable 67 to restore it to the 0 state after a predetermined time, which determines the shift produced. The connections from the other bistables 68, 69 and 70 to the buffers 9, 10 and 11 are similar. The output signals from the bistable circuits 67 to 70 are also used to effect guidance of the missile or other vehicle carrying the apparatus described.

In the case of pulses fed through either the buffer 10 or the buffer 11 to the counter 12, the change in the co-ordinate registered by that counter produces a change in timing of the line gating pulses, without a change in the timing of the line trigger pulses, and this gives rise to the selection of elements from the video signal from the camera 1 corresponding to a shift of the gate to left or right tending to restore conditions such that counter 61 exhibits the maximum correlation. The signal elements corresonding to the shifted gate are however fed out, one line delayed, with unchanged time relative to the line trigger pulses from the gate 5, so that they can be correlated with the signal elements in the delay line 42 without any shift of the elements therein. However, in the case of coordinate shift pulses fed through either the buffer 8 or the buffer 9, it would not be sufficient merely to produce a change in the timing of the frame gating pulses by one or more line periods. It would also be necessary to produce a corresponding shift of the elements in the delay line 42, if correct correlation is to be maintained. While it would be feasible to produce the effect of shifting the elements in the delay 42 by one or more line periods, an equivalent result is achieved in the example described by leaving the timing of the frame gating pulses unchanged and by changing the timing of the frame trigger pulses. This makes the gate start earlier or later relative to the beginning of the first scan after the change in the timing of the frame trigger pulses, so that the "position" of the gate is changed, though its timing is unchanged. Because of this "inverted" mode of operation, the connections from the buffers 8 and 9 are reversed, so that pulses from the buffer 8 cause the counter 13 to count down and vice versa.

Provision may be made to vary the co-ordinates registered in the counters 12 and 14 simultaneously, to allow for diagonal displacements of the target.

Various other modifications may be made to the form of apparatus illustrated in the drawing. For example the store 42 need not be a magnetostrictive delay line since it may comprise a shift register, composed for example of micro-electronic bistables. If a shift register is used, the application of the stored signal elements to the correlation gates 45 and 51 to 53 can be simply timed by means of shift pulses, to suit the timing of the frame gating pulses. Therefore the expedient can be adopted of shifting the timing of the frame gating pulses rather than those of the frame trigger pulses when guidance control is effected.

FIG. 2 illustrates a modification of the FIG. 1 arrangement relating to the generation of clock pulse and operation of the commutator 33.

The fast clock pulses are generated by the master oscillator 3 as before and are applied to the nine stage counter 4 which divides by 500 to generate the line trigger pulses at approximately 16 Kc/s frequency. The fast clock pulses from the oscillator 3 are also applied to a divide-by-twenty counter 100 to generate the slow clock pulses of 400 Kc/s frequency. The line frequency pulses from the counter 4 are applied as in FIG. 1 to the counter 6, and pulses of opposite polarities and of half line frequency are taken from the first stage of this counter and applied to the gates 101 and 102 of the commutator 33. This enables the trigger 36 and counter 37 to be dispensed with.

In the modification which is illustrated in FIG. 3, the output connection from the bistable 66 to the buffer 103 is removed and applied instead to a gate 104 which controls the admission of slow clock pulses, of 400 Kc/s, from the gate 74 to the counter 80. The said output connection from the bistable 66 is also applied to another bistable 106. When the bistable 106 is in the 1 state it applies an enabling signal to a gate 105. When the bistable 106 is in the 0 state it applies an enabling signal to the gates 82 each of which in this embodiment requires three simultaneous inputs to produce an output pulse. It will be recalled that the passage of clock pulses through the gate 74 is initiated when the bistable 73 is switched to the 1 state by the end of the frame gate pulse at the end of each correlation process.

When the arrangement of FIG. 1 incorporates the modification illustrated in FIG. 3, 400 Kc/s per second clock pulses are admitted to the counter 80 by way of the gate 104 only if no displacement is indicated by the switching of the bistable 66 to the 1 state before any other of the bistables 67 to 70. When the bistable 66 is switched to the 1 state, and permits slow clock pulses to be applied to the counter, the gate 105 is also enabled to pass an output signal to the up-date line through the gate 105, the up-dating function if called for being the same as that described with reference to FIG. 1.

Assume counter 61 has indicated the highest correlation factor, that is to say there is no misalignment. Slow clock pulses are applied to the counter 80 via gates 74 and 104. The next highest correlation factor resets the bistable 73 via the buffer 103 and stops the application of the slow clock pulses to the counter 80. The counter 80 therefore records a measure of the difference between the correlation factors in the counter 61 and the next highest. Thus the counter 80 records an indication of the steepeness of the correlation curve in the vicinity of its peak. The lock on to the target is dependent on the steepness of the correlation curve near the peak, and therefore if the counter 80 records a low total, it is necessary to up-date the store 42 to improve the lock on to the target. On the hand, if the counter 80 records a high total no up-dating is required. The counter 80 is set up to produce an output signal to the gate 105 only when the recorded score (after completion of counting) is below a particular threshold. In this event updating occurs provided that the bistable 66 indicated no dusplacement of the target. The guidance of the vehicle is such as to tend to cause the counter 61 always to record the highest correlation factor and the test for up-dating will thus occur except when correction of the course of the missile is required.

In a further modification of the apparatus described, up-dating may be arranged to occur either when the highest correlation factor falls below an acceptable value, as described with reference to FIG. 1 or when the steepness of the correlation curve near its peak falls below an acceptable value, as described with reference to FIG. 3. Alternatively, the up-dating may be arranged to occur only when the correlation falls below the threshold value and the steepness of the correlation curve near its peak is too low.

In the apparatus described with reference to FIG. 1 it is assumed that acquisition of a target is achieved by an operator manipulating the joy stick 14 whilst observing a display of the scene viewed by the camera 1. A suitable marker generator may be connected to the nine stage binary counters 12 and 13 or otherwise to generate a marker on the display denoting the point whose coordinates are stored in these counters. The marker may for example represent cross wires. However when the missile is subject to yaw and pitch, acquisition of the target becomes difficult. To facilitate acquisition it is proposed to trigger the scanning waveforms of the display not by means of the line and frame trigger pulses from the gates 5 and 7 but in response to trigger pulses the timing of which is related to timing of the line and frame gating pulses from the circuits 15 and 21. This proposal is illustrated in FIG. 4 which shows a connection taken from the equality gates 15 to a delay element 110 producing a delay of approximately half a line period, the output of the delay element 110 being the line trigger pulses for the display scan. Similar trigger pulses having a fixed delay relative to output of the equality gates 21 are used for the frame scan of the diaplay. In this way there is produced a stabilised display in which the target designated by the cross wires is maintained relatively stationary notwithstanding yaw and pitch of the missile. In FIG. 4 the marker generator is represented diagrammatically by the block 111. It may be of a known construction and is arranged to superimpose on the signals fed to the display, bright-up pulses which produce cross wire symbols such as denoted by the reference 112 in FIG. 5, the point of intersection of the cross wires being located approximately in the centre of the gate defined by the pulses from the gate 18.

It is a feature of the apparatus illustrated in FIG. 1 that almost any region of the scene can be tracked so that if the operator of the joy stick 14 does not designate the target exactly at the first attempt the apparatus will nevertheless lock on to the point designated which will in general be near the target. In the modification which is illustrated by FIG. 4, provision is made for allowing the operator to inch on to the target to correct the initial error as the missile approaches the target and the display of the target is more distinct because the picture is stabilised. To achieve inching an additional nine stage counter 113 is provided (similar to the counter 12) having count-down and count-up connections from terminals 114 and 115 of two switches 116 and 117. When the operator decides to inch on to the target he operates the switches 116 and 117 to break the inputs to the gates 10 and 11 from the input terminals L and R and to connect the latter terminals to 114 and 115. Manipulation of the joy stick will then cause 50 c/s pulses to be applied to the counter 113. The value of the count stored in the counter 113 is applied continuously to a nine stage parallel adder 118 to which is also applied the count stored in the counter 12. The result of the addition performed in the parallel adder 118 is fed to a nine stage accumulator 119. A similar arrangement of two swtiches, a counter, an adder and an accumulator are provided in association with the nine stage binary counter 13 so that inching can be effected in the line and frame co-ordinates respectively. A second marker generator 120 is provided which responds, say, to the signal in the accumulator 119 and the corresponding frame accumulator, and is arranged to generate signals which produce a second cross wire symbol 121 on the display, intersecting at the point defined by the co-ordinates in the two accumulators. This symbol 121 is distinguished in a suitable way from the symbol 112, (for example by being dotted). Therefore when the operator decides to effect inching, and manipulates the joy stick 14 for this purpose, he will be able to observe the second symbol move away from the first symbol until the point designated by the symbol is the desired target, this point being then defined by the co-ordinates stored in the accumulator 119 and in the corresponding frame accumulator.

When the correct target has been designated in this way, the operator then operates switch 122 to cause the contents of the accumulator 119 and the corresponding accumulator for the frame co-ordinate, to be transferred to the respective counters 12 and 13. This will then shift the position of the gate defined by the triggers 16 and 22, and eventually guide the missile on to the correctly designated target. Operation of the switch to effect transfer from the accumulators to the counters 12 and 13, restores the switches 116 and 117 to their normal condition.

In another modification of the arrangement illustrated in FIG. 1 the repetition frequency and duration of the shift pulses applied to the gate 31 is varied as line scanning progresses so that the signal element stored in different parts of the shift registers 34 or 35 (as the case may be) represent elements of differing size along the line. In this way information from the edges of the gate may be stored with coarse definition (the selected elements being large) and information from the centre of the gate with fine definition (small elements).

The modification which is illustrated in FIG. 6 represents one way in which this variable definition in the line direction can be achieved. According to this modification, the gating pulses for the gate 31 of the commutator 33 are controlled as to their duration and frequency by a plurality of triggers 130, 131, 132 and 133. These triggers have connections from buffers, denoted generally by reference 140, which receive pulses from the five stage counter 19 when the counter records different counts. In this case however the input to the counter 19 is obtained not from the clock 3 but from a buffer 138. The counts can be detected in known manner by gates which are not shown. When the bistables 130 to 133 are in the 1 state, they enable gates 134 to 137 so as to pass shift pulses to the buffer 138 and thence to the gate 31. The shift pulses are obtained directly from the clock 3 in the case of the gate 134, and from the first three stages of the counter 4 in the case of the gates 135 to 137 respectively. The numbers on the buffers 140 indicate the binary states of the counter 19 at which pulses occur, and it will be apparent that the pulses applied to the gate 31 diminish in duration from the beginning of each line of the gate to the middle thereof and then increase to the end of the gate, the maximum definition being achieved in the centre portion of the gate when five of the 8 Mc/s pulses are applied to the gate 31.

Variable resolution in the frame direction can be achieved by a similar modification. It is necessary to integrate the output signal of the camera during the signal elements of low definition and for the frame direction this integration can be achieved by elongating the scanning spot in the camera or otherwise.

What we claim is:
1. Automatic target following apparatus comprising
   a. sensing means for deriving a video signal representing a target,
   b. means for storing signal elements from a frame of said video signal,
   e. means for comparing signal elements from a subsequent frame of said video signal with the stored signal elements with different relative phase shifts to detect deviation from a desired point of view of the target, d. said comparing means including means for deriving a plurality of correlation signals dependent on the correlations of the signal elements from said subsequent frame and said stored signal elements with different relative phase shifts,
e. means for deriving a guidance signal for the apparatus from said comparing means,
f. means for detecting a decline in the correlation of signal elements from said subsequent frame and said stored signal elements,
g. said detecting means including means for detecting the difference between the largest correlation signal value and an optimum correlation signal value, and
h. means for updating said stored signal elements when the decline as represented by said difference exceeds a pre-arranged limit, thereby to allow for changes in the relative size of the target with approach of the apparatus thereto.

2. Automatic target following apparatus comprising
a. sensing means for deriving a video signal representing a target,
b. means for storing signal elements from a frame of said video signal,
c. means for comparing signal elements from a subsequent frame of said video signal with the stored signal elements with different relative phase shifts to detect deviation from a desired point of view of the target,
d. said comparing means including means for deriving a plurality of correlation signals dependent on the correlations of the signal elements from said subsequent frame and said stored signal elements with different relative phase shifts,
e. means for deriving a guidance signal for the apparatus from said comparing means,
f. means for detecting a decline in the correlation of signal elements from said subsequent frame and said stored signal elements,
g. said detecting means including means to derive a correlation slope signal dependent on the slope of the correlation function defined by said correlation signals, and
h. means for detecting when the slope signal falls below a predetermined limit, and
j. means for updating said stored signal elements when the decline as represented by the fall of said slope signal exceeds a pre-arranged limit, thereby to allow for changes in the relative size of the target with approach of the apparatus thereto.

3. Automatic target following apparatus comprising
a. sensing means for deriving a video signal representing a target,
b. means for storing signal elements from a frame of said video signal,
c. means for comparing signal elements from a subsequent frame of said video signal with the stored signal elements with different relative phase shifts to detect deviation from a desired point of view of the target,
d. said comparing means including means for deriving a plurality of correlation signals dependent on the correlations of the signal elements from said subsequent frame and said stored signal elements with different relative phase shifts,
e. means for deriving a guidance signal for the apparatus responsive to the largest of said correlation signals,
f. means for detecting a decline in the correlation of signal elements from said subsequent frame with said stored signal elements, and
g. means for updating said stored signal elements when the decline exceeds a pre-arranged limit, thereby to allow for changes in the relative size of the target with approach of the appartus thereto.

4. Automatic target following apparatus comprising
a. sensing means for deriving a video signal representing a target,
b. means for storing signal elements from a frame of said video signal,
c. means for comparing signal elements from a subsequent frame of the video signal with the stored signal elements with different relative phase shifts to detect deviation from a desired point of view of the target,
d. means for generating gating pulses to select video signal elements in respective frames for application to said storing means and to said comparing means, said gating pulses defining a gate in each frame,
e. means for deriving a guidance signal for the apparatus from said comparing means,
f. means responsive to said guidance signal for varying the relative timing of said gating pulses to produce the effect of displacing said gate so as to maintain it locked on a target part,
g. said means for varying the relative timing of said gating pulses being operative to change the timing of line gating pulses whilst leaving the timing of line scan triggering pulses unchanged and being operative to change the timing of frame scan triggering pulses whilst leaving the timing of frame gating pulses unchanged,
h. means for detecting a decline in the correlation of signal elements from said subsequent frame with said stored signal elements, and
j. means for updating said stored signal elements when the decline exceeds a pre-arranged limit, thereby to allow for changes in the relative size of the target with approach of the apparatus thereto.

5. Automatic target following apparatus comprising
a. sensing means for deriving a video signal representing a target,
b. means for storing signal elements from a frame of said video signal,
c. means for comparing signal elements from a subsequent frame of said video signal with the stored signal elements with different relative phase shifts to detect deviation from a desired point of view of the target,
d. means for deriving a guidance signal for the apparatus from said comparing means,
e. means for generating gating pulses to select video signal elements in respective frames for application to said storing means and to said comparing means, said gating pulses defining a gate in each frame,
f. means responsive to said guidance signal for varying the relative timing of said gating pulses to produce the effect of displacing said gates so as to maintain it locked on the target part,
g. said means for producing the effect of displacing said gate including a shift register to which the selected video signal elements are applied, and means for varying the timing of pulses for admitting said signal elements to said shift register and of shift pulses for said shift register, h. means for detecting a decline in the correlation of signal elements from said subsequent frame with said stored signal elements, and j. means for updating said stored signal elements when the decline exceeds a pre-arranged limit, thereby to allow for changes in the relative size of the target with approach of the apparatus thereto.

6. Automatic target following apparatus comprising a. sensing means for deriving a video signal representing a target, b. means for storing signal elements from a frame of said video signal, c. means for comparing signal elements from a subsequent frame of said video signal with the stored signal elements with different relative phase shifts to detect deviation from a desired point of view of the target, d. means for generating gating pulses to select video signal elements in respective frames for application to said storing means and to said comparing means, e. said gating pulses defining a gate in each frame and the lengths of said gating pulses varying to cause the signal elements in a central part of said gate to have a higher definition than the signal elements at the edges of said gate, f. means for deriving a guidance signal for the apparatus from said comparing means, g. means for detecting a decline in the correlation of signal elements from said subsequent frame with said stored signal elements, and h. means for updating said stored signal elements when the decline exceeds a pre-arranged limit, thereby to allow for a relative change in the size of the target with approach of the apparatus thereto.

7. Automatic target following apparatus comprising a. sensing means for deriving a video signal representing a target, b. means for storing signal elements from a frame of said video signal, c. means for comparing signal elements from a subsequent frame of said video signal with the stored signal elements with different relative phase shifts to detect deviation from a desired point of view of the target, d. means for generating gating pulses to select video signal elements in respective frames for application to said storing means and to said comparing means, said gating pulses defining a gate in each frame, e. manual means for designating a target different from the target designated by said gate without interrupting the operation of said means for generating the gating pulses, f. means for subsequently changing the timing of said gating pulses in response to said manual means to shift the gate to said different target part, g. means for deriving a guidance signal for the apparatus from said comparing means, h. means for detecting a decline in the correlation of signal elements from said subsequent frame with said stored signal elements, and j. means for updating said stored signal elements when the decline reaches a pre-arranged limit, thereby to allow for changes in the relative size of the target with approach of the apparatus thereto.

* * * * *